2,800,451
Patented July 23, 1957

2,800,451
PROCESS FOR MAKING ALKYL PHENOLIC MATERIALS AND DERIVATIVES THEREOF

Henry O. Mottern, Bloomfield, and Theodore J. Peters, Somerville, N. J., assignors to Esso Research and Engineering Company, a corporation of Delaware No Drawing. Application May 25, 1953,
Serial No. 357,382

13 Claims. (Cl. 252—42.7)

This invention is concerned with an improved process for manufacturing alkyl phenolic materials in which a phenol is alkylated with an olefin in the presence of a Friedel-Crafts catalyst. It is also concerned with preparing improved derivatives from these alkyl phenols.

Alkyl phenols are generally prepared on a commercial scale by reacting a phenolic material with an olefinic hydrocarbon in the presence of a Friedel-Crafts catalyst. Metal phenates may be prepared by direct neutralization of the alkyl phenol with a basic neutralizing agent. The sulfide derivatives are generally made by sulfurizing the alkyl phenol with a sulfur halide, sulfur oxyhalide and the like. The resulting alkyl phenol sulfide resins are also readily converted to the metal derivatives by known means. These and other derivatives of alkyl phenols are quite useful as additives for improving various characteristics of mineral oils and the like. Specific art teaching the preparation of such compounds includes U. S. Patents 2,294,145 to Winning et al.; 2,398,253 to Rogers et al.; and 2,425,824 to Peters et al.

A number of problems are encountered in these various processes. The presence of the Friedel-Crafts catalyst in the crude alkylate product from the alkylation step leads to dealkylation, isomerization, or other degradation reactions involving the desired alkylate product. This problem is particularly serious when the warm molten alkylated phenol must be stored for any appreciable length of time before it is sulfurized. The degradation products formed in the presence of the catalyst are frequently of uncertain value in making phenol sulfides. For example, they or their derivatives are often dark-colored bodies that have limited solubility in lubricating oils and are of doubtful value as detergent additives.

It has been suggested that the catalyst should remain in the alkylate product resulting from alkylation in the presence of boron halide catalysts. This procedure has special utility when a boron halide catalyst is used and when the alkylate is ultimately sulfurized with a sulfur halide in the presence of a solvent. This approach has its limitations for the reasons mentioned above, however, unless the alkyl phenol is sulfurized almost immediately after the alkylation reaction. These and other disadvantages are inherent in the conventional phenol alkylation procedures.

It is therefore a chief object of the present invention to provide a means for maximizing the yield of desired alkylate and minimizing the production of undesirable reaction products following the alkylation reaction. It is a further object of the invention to provide improvements in the production of the various derivatives of the alkylated phenolic materials.

In accordance with the present invention, a phenolic material is alkylated with an olefin in the presence of a conventional Friedel-Crafts catalyst. The crude alkylate-containing product withdrawn from the reaction zone then has added to it an oxy organic compound having at least about 8 carbon atoms. The alkylate may then be stored for long periods of time or otherwise handled without resorting to any product separation or catalyst removal operations. In a preferred embodiment of the invention, the alkylate-oxy organic compound mixture is subsequently treated with a sulfur halide or other sulfurizing agent, preferably in the presence of a solvent, to form a phenol sulfide. In a further modification, the alkyl phenol sulfide is treated with a metal neutralizing agent to form a metal salt. These and other modifications of the invention will be explained in more detail herein below.

It has been found that the addition of an oxy organic to the crude alkylate product materially reduces the degradation reactions discussed above. Although the theoretical basis for this improvement cannot be explained at this time, it is believed to be due chiefly to the formation of a complex between the oxy organic compound and Friedel-Crafts catalyst present in the product. Such a complex would have a relatively low catalytic activity and therefore not contribute to further reaction to any substantial extent. The presence of the oxy organic compound during the sulfurization reaction is not detrimental and actually contributes to the formation of a superior phenol sulfide product. This is illustrated by the fact that the phenol sulfide produced in the presence of the oxy compound has a lower viscosity and a much better color than that produced under conventional conditions.

The oxy compound or its derivatives carries through with the phenol sulfide to the neutralization step and acts as a viscosity reducer and foam suppressor during the neutralizing step. It has been conventional to add oxy organic compounds per se to oil solutions of alkyl phenol sulfides being neutralized in order to avoid viscosity increases and foaming difficulties. This method is taught in the Winning et al. patent mentioned above.

The following examples are presented to illustrate the improvements to be obtained by practicing the present invention.

*Example 1.—Effect of alcohol addition on alkyl phenol stability*

Phenol and diisobutylene were reacted in a stirred reaction zone at a temperature of about 80° C., atmospheric pressure, and 30 minutes contact time using boron trifluoride catalyst. The phenol to diisobutylene mol ratio was about 1:1. The $BF_3$ concentration was about 1.0% based on the phenol.

The crude product was then divided into three portions. The first portion was immediately freed of $BF_3$ catalyst by washing with a saturated aqueous solution of sodium carbonate and then fractionated to determine the relative concentrations of tert.-octyl phenol, the desired product, of unreacted diisobutylene and phenol, and of light and heavy ends consisting chiefly of lower and higher molecular weight alkyl phenol products. The second portion was stored overnight without further treatment at a temperature of 80° C., this temperature level being used since it maintained the product in a molten condition. The following day, the $BF_3$ was removed by washing with aqueous sodium carbonate and the product was then fractionated.

The third portion immediately had added to it 15 weight percent, based on the crude product, of "Lorol B" alcohols. These alcohols are $C_{10}$–$C_{18}$ alcohols derived from hydrogenated coconut oil. The mixture was then stored overnight at a temperature of 80° C. and was fractionated the following day without prior removal of the BF₃. The results of these tests are given in Table I below:

| Run No. | Alkylate Treatment | Composition of Crude Alkylate, Weight Percent | | | |
|---|---|---|---|---|---|
| | | tert.-Octyl Phenol | Di-iso-butylene | Phenol | Light and Heavy Ends |
| A | Distilled immediately | 80.05 | 0.25 | 1.95 | 17.75 |
| B | Stored overnight at 80° C. | 68.55 | 0.35 | 3.45 | 27.65 |
| C | Added 15% "Lorol B" alcohol and stored overnight at 80° C. | 74.70 | 0.10 | 1.45 | 23.75 |

Immediate removal of BF₃ followed by distillation of the alkylated product was carried out to show that a relatively high concentration of the desired alkyl phenol, tert.-octyl phenol, was produced during the alkylation step. Storage overnight in the presence of BF₃ resulted in a substantial reduction of the desired alkyl phenol content and increased appreciably the concentration of light and heavy ends. Addition of the alcohol to the crude product followed by storage gave about 6% less isomerization than was obtained in the case of the untreated fraction that was stored overnight.

*Example 2.—Formation of derivatives of alkyl phenol*

Portions of the crude alkylate containing BF₃ (run B of Example 1), and of this crude alkylate to which had been added 15% of "Lorol B" alcohols (run C of Example 1), were sulfurized by treatment with sulfur dichloride. In each case, equal portions of the alkylate mixture and of hexane solvent were treated in a stirred reaction zone using a molar ratio of sulfur halide to alkyl phenol of about 1.5:2.0 at a temperature of about 30° C. Hydrogen chloride vapors were removed from the reaction mixture. After the sulfurization reaction was completed, hexane solvent was stripped from the product by distillation, and the tert.-octyl phenol sulfide product was blended with an equal quantity of a mineral lubricant base stock having an SUS viscosity at 210° F. of 45. The oil concentrations were analyzed for sulfur content and were submitted to Tag-Robinson color and viscosity determinations.

Another sulfurization run was carried out under substantially the same conditions as shown above using commercial scale equipment. The tert.-octyl phenol charge stock for this run was obtained in conventional commercial scale operations. Sufficient "Lorol B" alcohol was added to the oil concentrate to give an alcohol concentration equivalent to that in the material formed from product C.

Each of the above oil concentrates were then treated with barium hydroxide octahydrate at a temperature of about 120° C. in order to form the barium salts. In each case about 5% excess of barium hydroxide over that required to neutralize the phenol was used. Additional mineral lubricating base stock, having the same viscosity as that added to the sulfide, was introduced into the mixture during the neutralization step in order to form a final concentrate containing about 35–40 weight percent of the barium salt of tert.-octyl phenol sulfide. The resulting metal salt concentrations were analyzed for sulfur and barium contents. Water sensitivity, viscosity and color determinations were also made on these products.

The term "tert.-octyl phenol sulfide" as used in this example refers to the crude alkylate derivative which, as shown in Example 1, is a concentrate of t.-octyl phenol containing impurities such as lower and higher molecular weight alkyl phenols, isomers, etc.

The summarized data from these various runs are tabulated in Table II below:

TABLE II

| | Product | "Lorol B" Alcohol added to crude alkyl phenol | Inspections on Product | | | | |
|---|---|---|---|---|---|---|---|
| | | | Sulfur, Wt. percent | Barium, Wt. percent | Color, Tag-Robinson | S. U. S. Viscosity at 210° F. | Water Sensitivity |
| 1 | 50% t.-octyl phenol sulfide; 50% mineral oil.¹ | No | 5.4 | 0 | 11½ | 95.8 | (⁴) |
| 2 | 43.4% t.-octyl phenol sulfide; 6.6% "Lorol B" alcohols; 50.0% mineral oil.² | Yes | 5.2 | 0 | 15¼ | 87.4 | (⁴) |
| 3 | 40% barium t.-octyl phenol sulfide; 0% "Lorol B" alcohols; 60% mineral oil.¹ | No | 3.1 | 8.3 | 9+ | 184.3 | 35 |
| 4 | 36% barium t.-octyl phenol sulfide; 4% "Lorol B" alcohols; 60% mineral oil.³ | No | 3.4 | 8.6 | 8 | 140.0 | 10 |
| 5 | do ² | Yes | 3.6 | 8.0 | 10 | 161.6 | 10 |

¹ Derived from Run B product of Example 1.
² Derived from Run C product of Example 1.
³ Commercial run, alcohols added to oil solution before neutralization.
⁴ Not determined.

The phenol sulfide produced from the crude alkylate containing the alcohols had a materially better color and lower viscosity than that made from the straight crude alkylate. The improvement of color and lowering of viscosity obtained on the alcohol-containing sulfide were retained during the neutralization step. It is significant that the viscosity of the barium salt derived from the alcohol-treated alkylate was about 22 centistokes less than that for the barium salt produced from the alkylate containing no alcohols. This decreased viscosity, while higher than that of salts conventionally produced by adding alcohol to the alkyl phenol sulfide before neutralization, shows substantial utilization of alcohols added to the crude phenols. The water sensitivity of the metal salt produced in accordance with the present invention is as good as that of salts conventionally produced.

The alkylation reaction may be carried out in either a batch process or a continuous process. In these operations, the olefin, phenol and Friedel-Crafts catalyst are contacted under appropriate temperature and contact time conditions. Reaction temperatures in the range of about 50° to 100° C. are generally suitable. Reaction pressures will generally be atmospheric although lower or higher pressures may be employed.

The phenolic material used in the alkylation reaction may be phenol itself as well as other mono-hydroxy aromatic compounds such as the alkylated phenols, naphthols, and the like. The invention is also applicable to the alkylation of compounds of the class described which contain substituent atoms or groups that do not interfere with the alkylation reaction. Such groups include ester, keto, aldehyde, alkyl and the like groups. Naturally occurring phenols, such as those obtained by alkaline extraction of certain petroleum stocks, from cashew nut shells and the like may be used.

The olefins useful in the alkylation step may be straight or branched chain mono olefins having any suitable molecular weight. Those having in the range of about 4 to 20 carbon atoms, particularly from 6 to 16 carbon atoms, are preferred. Alkyl phenols produced from such materials are especially suitable as intermediates for producing oil soluble alkyl phenol sulfide resins. The olefins may be the various individual olefins or olefin-containing mixtures derived from petroleum sources such as refinery gases containing propylene, butylenes, amylenes and the like. The olefin polymers such as diisobutylene, triisobutylene, tripropylene, and other polymers obtained by polymerization of the lower olefins are particularly suitable. Tertiary olefins are generally more suitable than the less reactive primary and secondary olefins.

The catalyst employed in the alkylation reaction may be any suitable Friedel-Crafts catalyst of the type well known in the art. These include the aluminum halides such as aluminum chloride, tin halides such as stannic chloride, zirconium halides such as zirconium chloride and particularly the boron halides such as boron fluoride. These compounds may be used per se or as complexes with other compounds such as complexes of boron trifluoride and water or of boron trifluoride and phosphoric acid. Hydrogen fluoride may also be used. As a rule, in the range of about 0.5 to 10% by weight of the catalyst, generally about 1 to 2% by weight, based on the phenol, will be used in the reaction. Alkylation with tert.-olefins usually requires less catalyst than when primary or secondary olefins are being employed as alkylating agents.

The oxy organic compounds added to the alkylated phenol product may be selected from a wide variety of sources and include those listed in the above-identified Winning et al. patent. The higher fatty alcohols such as those having from about 10 to 20 carbon atoms per molecule are particularly useful, and those having above about 12 carbon atoms are preferred. The lower alcohols are unsuitable for this application. Their vapor pressures are too high for retention in the molten phenol product without resorting to pressure equipment. Furthermore, the lower alcohols do not impart plasticizing properties to salts made in subsequent neutralization operations. The corresponding higher unsaturated alcohols and other highly aliphatic oxy organic compounds may also be used, although they are generally less effective than the saturated types. Examples are the aliphatic oxy derivatives of naturally occurring fats and oils of mineral, vegetable and marine origin, including the esters, ethers, ketones and the like and similar compounds which may be synthetically prepared, as by oxidation of petroleum waxes and other high molecular weight aliphatic compounds.

Examples of these various alcohols are the saturated straight and branched chain aliphatic alcohols such as octyl alcohol, lauryl alcohol, cetyl alcohol, stearyl alcohol, and the like; the corresponding olefinic alcohols such as oleyl alcohols; cyclic alcohols, such as naphthenic alcohols; and aryl substituted alkyl alcohols such as phenyl octyl alcohol and the like. Mixed naturally occurring alcohols such as those found in wool fat, sperm oil, and the like are also useful.

The amount of the oxy organic materials added to the crude alkylate may be varied over a rather wide range, depending on the amount of catalyst present in the crude alkylate that must be deactivated and upon the concentration of alcohol desired in the final derivative, if such derivatives are to be prepared. A minimum amount is usually that amount that will form a molecular complex with the Friedel-Crafts catalyst, and generally an excess over this amount is preferred to impart plasticizing properties to the metal derivatives. In the range of about 1 to 25%, preferably 5 to 20%, based on the crude alkylate will generally be required. The stabilized crude alkylate may then conveniently be charged to a storage system and subsequently prepared for marketing, further purification, or the like, or it may be charged to a reaction zone for sulfurization or neutralization by one of the well-known prior art methods.

In a preferred method for sulfurization, the stabilized alkylate is dissolved in a suitable solvent, such as a petroleum naphtha, aromatic-type solvents and other predominantly hydrocarbon volatile constituents, before sulfurization. Other solvents include halogenated hydrocarbons such as alkyl halides, chloroform, carbon tetrachloride, and the like. The amount of solvent used should be sufficient to prepare a solution containing up to about 60% by weight of the alkylated phenol. The solvent-alkylate phenol mixture is then reacted with a sulfur halide or the like, usually in an agitated reactor, at a temperature in the order of about 0° to 100° C., preferably about 20° to 40° C. The mol ratio of sulfur halide to alkyl phenol is preferably in the range of about 1:2 to 2:2. After the reaction is completed, solvent may be stripped from the resulting alkyl phenol sulfide.

Although the sulfurization reaction has been described in connection with the use of a solvent, the reaction is also carried out in the absence of a solvent. Under such conditions, the molten alkyl phenol-alcohol mixture is contacted with sulfur chloride at a temperature in the range of about 80° C. to 125° C. under conditions such that hydrogen chloride vapors are removed. This approach is sometimes preferred when it is desired to produce a low viscosity product.

Either the alkyl phenol or the alkyl phenol sulfide may be converted to the metal salt by treatment with a metal neutralizing agent of a type well known to the art. Suitable basic reacting metal compounds useful in the reaction include the oxides, hydroxides, sulfides, carbonates and the like of various metals. The compounds of the polyvalent metals, particularly alkaline earth metals, are generally preferred if the metal salt is to be used as a detergent additive for lubricants. Thus calcium hydroxide and barium hydroxide are very effective for this purpose. Compounds of other metals such as of sodium, potassium, aluminum and the like may also be used for the neutralization reaction.

A particularly useful neutralization procedure involves dissolving the alkyl phenol- or alkyl phenol sulfide-alcohol mixture in a mineral lubricant base stock to form a free flowing mass to which the neutralizing agent may be added. The mineral lubricant will be added in amounts such that the final product will contain in the range of about 30 to 70 weight percent of active metal salt. This solution may be heated to a temperature in the range of about 100° to 250° C., and the neutralized agent is added with stirring. The presence of the oxy organic compound, either as a complex with the catalyst or in the free state, helps reduce viscosity of the oil solution, minimizes foaming difficulties and provides other advantages as heretofore mentioned. It is generally unnecessary to add additional oxy organic compounds during the neutralizing step providing sufficient alcohol has been added to the crude alkylated phenol as discussed above.

The concentrate of oil containing the metal salt of the phenolic material may then be stored and shipped in that form. It is conveniently used as an additive material by merely blending a sufficient amount of the concentrate with the material to be improved such that the final concentration of active ingredient will impart the desired properties to the final blend.

What is claimed is:

1. In the process of preparing an alkylated phenolic material wherein a phenolic material is reacted with an olefin in the presence of a Friedel-Crafts alkylation catalyst and wherein a product containing said catalyst is obtained, the improvement which comprises adding to said product after the reaction is completed, a catalyst deactivating amount of an aliphatic alcohol having in the range of about 8 to 20 carbon atoms.

2. The process of claim 1 wherein said product after addition of said aliphatic alcohol is further reacted with a sulfur halide.

3. The process of claim 2 wherein the sulfur halide treated product is further reacted with a basic acting metal compound.

4. In the process of preparing an alkyl phenol which comprises alkylating a phenol with an olefin in the presence of a boron halide-containing catalyst to form a reaction product containing said catalyst, the improvement which comprises adding to the product, after the reaction is completed, an aliphatic alcohol having in the range of about 8 to 20 carbon atoms.

5. In the process of forming an alkyl phenol sulfide in which phenol is first alkylated with an olefin in the presence of a boron fluoride catalyst to form a product containing alkyl phenol and catalyst, and in which the product is then sulfurized with a sulfur chloride, the improvement which comprises adding to said product before said sulfurization in the range of about 1 to 25% by weight, based on the product, of an aliphatic alcohol having in the range of 8 to 20 carbon atoms.

6. A process for forming metal alkyl phenol sulfides which comprises alkylating phenol with an olefin hydrocarbon having in the range of about 4 to 20 carbon atoms in the presence of boron fluoride catalyst, recovering an alkyl phenol product containing said catalyst, mixing therewith a $C_{10}$–$C_{20}$ aliphatic alcohol in an amount in the range of about 5 to 20%, based on said product, reacting the resulting mixture with a sulfur chloride to form an alkyl phenol sulfide, dissolving said sulfide in a mineral lubricant base stock, and reacting said sulfide with an alkaline earth metal hydroxide to form the metal salt derivative thereof.

7. A process as in claim 6 wherein said alcohol is a mixture of $C_{10}$–$C_{18}$ alcohols derived from hydrogenated coconut oil.

8. A process as in claim 7 wherein said olefin is diisobutylene, and said catalyst is used in an amount in the range of about 0.5 to 10% by weight, based on said phenol.

9. A process as in claim 8 wherein said sulfur chloride is sulfur dichloride.

10. A process as in claim 9 wherein said hydroxide is barium hydroxide.

11. In the process of preparing an alkyl phenol sulfide which comprises alkylating a phenol with an olefin in the presence of a boron halide-containing catalyst to form an alkylated product containing said catalyst and further reacting said alkylated product with a sulfur chloride to form an alkyl phenol sulfide, the improvement which comprises adding to said alkylated product after the alkylation reaction is completed in aliphatic alcohol having in the range of about 8 to 20 carbon atoms.

12. In the process of preparing a metal alkyl phenol sulfide which comprises alkylating a phenol with an olefin in the presence of a boron halide-containing catalyst to form an alkylated product containing said catalyst, further reacting said alkylated product with a sulfur chloride to form an alkyl phenol sulfide and subsequently dissolving said alkyl phenol sulfide in a mineral lubricant base stock and reacting it with a polyvalent metal basic reacting compound, the improvement which comprises adding to said alkylated product after the alkylation reaction is completed an aliphatic alcohol having in the range of about 8 to 20 carbon atoms.

13. In the process of forming a metal alkyl phenol sulfide in which a phenol is first alkylated with an olefin in the presence of a boron fluoride catalyst to form an alkylated product containing said catalyst and in which said alkylated product is then sulfurized with a sulfur chloride to form an alkyl phenol sulfide and in which said alkyl phenol sulfide is then dissolved in a mineral lubricant base stock and is reacted with an alkaline earth metal basic reacting compound, the improvement which comprises adding to said alkylated product before said sulfurization in the range of about 1 to 25% by weight, based on the alkylated product, of an aliphatic alcohol having in the range of 8 to 20 carbon atoms.

References Cited in the file of this patent

UNITED STATES PATENTS

| | | |
|---|---|---|
| 2,294,145 | Winning et al. | Aug. 25, 1942 |
| 2,406,564 | Rogers et al. | Aug. 27, 1946 |